United States Patent [19]

Vasilescu

[11] Patent Number: 5,227,934
[45] Date of Patent: Jul. 13, 1993

[54] DEVICE FOR MAKING INDEPENDENTLY OPERABLE IN TIME, A TAPE RECORDING DEVICE AND A DEVICE FOR PLAYING BACK SAID TAPE

[76] Inventor: Dan Vasilescu, 175, avenue du Roule, 92200 Neuilly sur Seine, France

[21] Appl. No.: 635,551
[22] PCT Filed: Jul. 10, 1989
[86] PCT No.: PCT/FR89/00366
  § 371 Date: Jan. 3, 1991
  § 102(e) Date: Jan. 3, 1991
[87] PCT Pub. No.: WO90/00800
  PCT Pub. Date: Jan. 25, 1990

[30] Foreign Application Priority Data
Jul. 13, 1988 [FR] France .................. 88 09601

[51] Int. Cl.⁵ .............................................. G11B 15/26
[52] U.S. Cl. .................................... 360/90; 360/84
[58] Field of Search ............... 360/90, 83, 84, 13, 360/31

[56] References Cited

U.S. PATENT DOCUMENTS

| | | | |
|---|---|---|---|
| 3,176,927 | 4/1965 | Irazoqui | 242/55.12 |
| 3,235,195 | 2/1966 | Hebb et al. | 242/55.19 |
| 3,492,442 | 1/1970 | Kaiser | 179/100.2 |
| 3,733,719 | 5/1973 | Ley | 35/35 C |
| 4,388,659 | 6/1983 | Lemke | 360/90 |

FOREIGN PATENT DOCUMENTS

| | | |
|---|---|---|
| 502057 | 6/1952 | Belgium . |
| 229996 | 7/1987 | European Pat. Off. . |
| 1050390 | 1/1954 | France . |
| 1087749 | 2/1955 | France . |
| 1053372 | 12/1966 | United Kingdom . |

Primary Examiner—Robert S. Tupper
Attorney, Agent, or Firm—Marshall & Melhorn

[57] ABSTRACT

The present invention relates to a tape recorder system with a tape recording device and a playback device independently operable in time. The tape recorder system includes a recording sub-assembly provided with a feeding reel and a recording device, and a playback sub-assembly provided with a playback device and a receiving reel. The system according to the present invention also includes a circular intermediate reel between the recording subassembly and the playback sub-assembly, the intermediate reel comprising at its periphery a retractable bearing surface and a drive roller from which the tape is directed towards the playback sub-assembly. The playback subassembly is fastened to the intermediate reel and driven in rotation therewith.

4 Claims, 1 Drawing Sheet

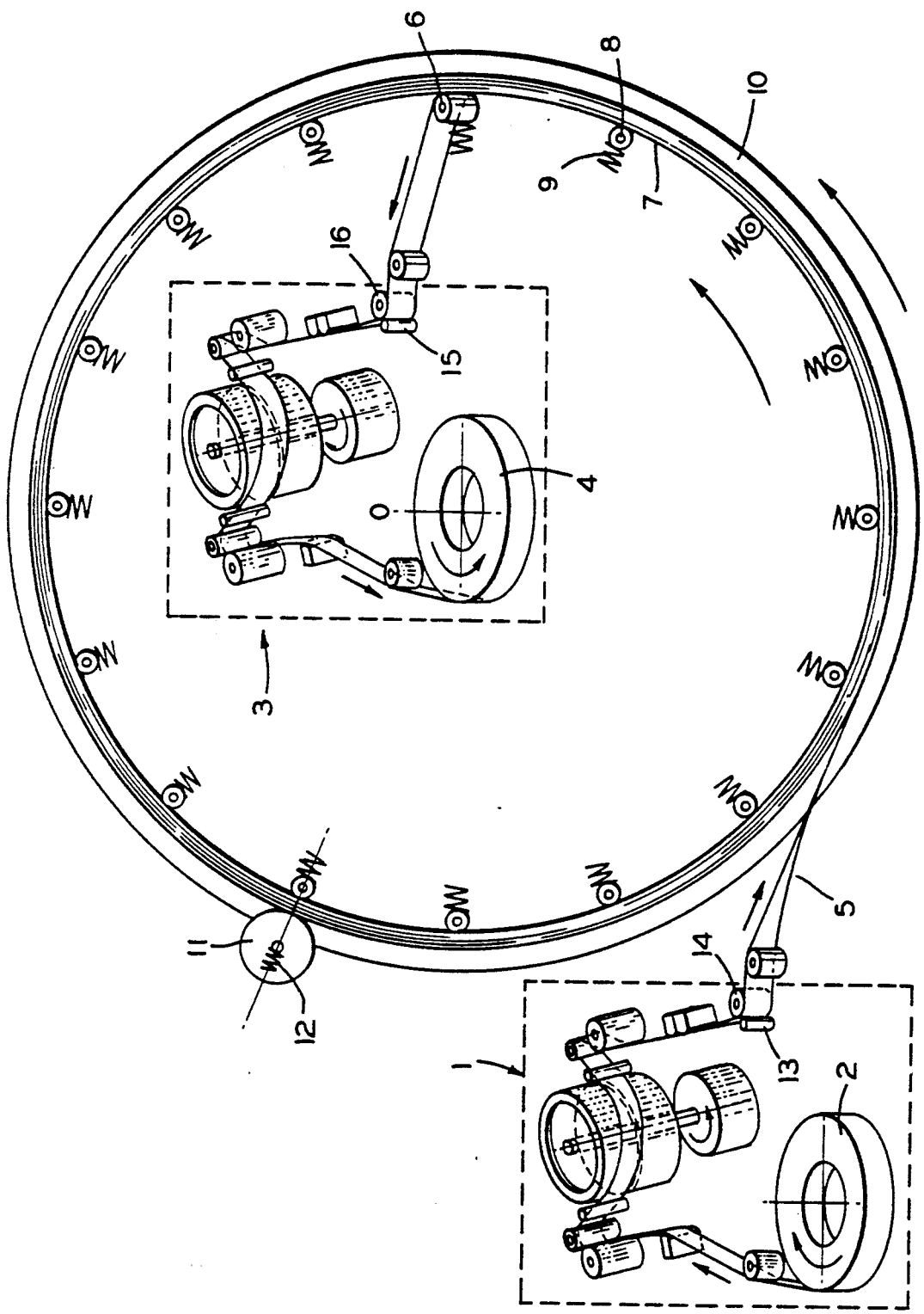

DEVICE FOR MAKING INDEPENDENTLY OPERABLE IN TIME, A TAPE RECORDING DEVICE AND A DEVICE FOR PLAYING BACK SAID TAPE

BACKGROUND OF THE INVENTION

1. Field of the Invention

The present invention relates generally to a system for making magnetic tape recordings and more specifically to a magnetic tape recorder system with independent recording and playback functions.

2. Description of the Related Art

In the most conventionally known application of a tape system for recording and playing back signals (whether analog or digital signals), the tape is drawn from a feeding reel and moved past a recording head, then past a playback head, to be finally wound up on a receiving reel.

The main fields of application of these techniques are:

a) the audio-visual field (magnetic tape recorders, video recorders) at professional, consumer, research, industrial, medical or other levels;

b) the data processing field with computers using tapes as data carriers.

In all the aforesaid applications, data can be recorded and played back either simultaneously or with delayed playback. An example of simultaneous recording and playback is conventional magnetic tape recorders and video recorders, where the recorded programs can be watched (or listened to) during the recording.

Delayed playback is where recording and playback occur at different times. In the case where only one conventional recorder is used, the operator has to wait for the end of recording before rewinding the tape and playing back the tape. The duration of the pre-recorded replay is necessarily longer than the duration of the original recorded sequence.

Under various circumstances, it may be advantageous to render the recording part of the device and the playback part of the device independently operable in time. This is the primary object of the present invention.

As used herein, "independently operable in time" means that the replay of the tape may begin not only after the recording is completed, but also while the recording is still in process. The present invention combines both of these possibilities, providing the operator with the option of replaying the tape after the recording is completed or replaying the tape, at a different speed than the recording tape speed, while the recording is in process.

SUMMARY OF THE INVENTION

In accordance with the present invention, there is provided a tape recorder system for physically separating the recording device from the playback device, and for inserting between the recording device and the playback device, a tape storing device. The two conventionally known devices (recording and playback) are adapted as necessary to interface with the storing device.

The tape recorder system according to the present invention includes a fixed element provided with a recording sub-assembly and a second element provided with a playback sub-assembly. The recording sub-assembly includes a feeding reel and a recording device. The playback sub-assembly includes a playback device and a receiving reel, the rotation of which is controlled by a motor. A circular intermediate reel is located between the recording sub-assembly and the playback sub-assembly. The intermediate reel is driven about its axis by a motor and includes a retractable bearing surface on its periphery for receiving the tape leaving the recording sub-assembly. A controlling roller, which directs the tape towards the playback sub-assembly, frictionally engages and is driven by the intermediate reel.

In the description of the invention provided hereinabove, the recording sub-assembly and the playback sub-assembly have been differentiated for clarity's sake. Those in the art will understand from reading the present description that the device according to the present invention is reversible, meaning that subject to a few minor adaptations relative to the direction and speed of rotation of the reels, the sub-assemblies are interchangeable. Also, each sub-assembly may include elements permitting recording as well as elements permitting playback.

BRIEF DESCRIPTION OF THE DRAWINGS

The above, as well as other advantages of the present invention, will become readily apparent to those skilled in the art from the following detailed description of a preferred embodiment when considered in the light of the accompanying drawing in which:

The figure is a diagrammatical view of the device including the recording and playback sub-assemblies and the intermediate reel.

DESCRIPTION OF THE PREFERRED EMBODIMENT

Referring now to the figure, there is illustrated a recording device of the present invention. A recording sub-assembly 1 is of a conventionally known type and includes a feeding reel 2, video and audio erasing heads, one or more video and audio recording heads and rollers for directing the tape, a capstan 13 and a capstan idler 14. The axial rotation of the feeding reel 2 is controlled by a motor (not shown). The capstan 13 and capstan idler 14 ensure that the tape 5 progresses at controlled speed, or may act to lock the tape 5 in position. The tape 5 coming out of the recording subassembly 1 is directed towards the intermediate reel 7.

A playback sub-assembly 3, which is similar to the recording sub-assembly 1, includes a receiving reel 4, one or more playback heads and rollers for directing the tape, a capstan 15 and a capstan idler 16. The axial rotation of the receiving reel 4 is controlled by a motor (not shown).

The tape 5, issuing from the recording sub-assembly 1, winds around the intermediate reel 7. The tape 5 is directed off the intermediate reel 7 to the playback subassembly 3 by the directing roller 6. It should be noted that the playback sub-assembly 3 is mounted on the inside of the intermediate reel 7, this being one of the novelties of the system according to the present invention.

The tape 5 is stored around the intermediate reel 7 in the figure. The intermediate reel 7 is essentially a wheel supported on its peripheral edge by a number of rollers 8 which define a circular bearing surface. Each roller 8 is mounted in such a way as to be able to move substantially radially under the effect of a force which can be caused by a pulling action exerted on the tape 5 when the rotation of the receiving reel 4 is initiated. The radial movement of the rollers 8 may also be caused by suitable control devices. Such radial movement of the rollers 8 is important to obtain a suitable winding of the tape 5 around all of the rollers 8. The rollers 8 are urged toward their initial position by springs 9.

The rotation of the rollers 8 about their individual axis is caused either by the tape 5 (by friction) or by mechanical drive means (not shown).

The intermediate reel 7 may be either in the form of a disc having a bearing in its geometrical axis, or in the form of a wheel without hub (such as for example a spokeless bicycle rim), the bearings being situated on the circumference. If the intermediate reel 7 is formed as a hubless wheel, there is more space inside the intermediate reel 7 to receive, for example, a rotary playback head complete with its drive means.

The intermediate reel 7 is mounted for free rotation about its axis on a support (not shown), and can be driven in rotation about its axis by a motor (also not shown). A drive roller 11 may be provided and driven by a separate motor (not shown). A spring 12 urges the roller 11 against outer periphery of the tape 5 stored on the intermediate reel 7. Thus engaging the tape 5, the roller 11 may be rotated to drive the intermediate reel 7 at the peripheral speed required to ensure proper takeup of the tape 5. It will be noted that in the figure, the rotating axis of the receiving reel 4 and the intermediate reel 7 coincide.

The playback sub-assembly 3 and the directing roller 6 are secured to the intermediate reel 7 and are rotatable with it. The directing roller 6 is also preferably provided with a spring enabling it to move radially.

A plate 10 can be placed under the intermediate reel 7. The plate 10 has the same rotational axis as the intermediate reel 7, but is driven by a different motor (not shown) than the motor driving the intermediate reel 7. In addition, the drive roller 11 is driven by a separate motor (not shown) and may be used to differentiate the tape speed. The drive roller 11 presses against the tape 5 stored on the periphery of the intermediate reel 7, said pressing action being ensured by a spring 12. The drive roller 11 maintains the peripheral speed necessary to ensure that the tape 5 is being received.

Obviously, the rotational speed of the various motors used in the device must be interrelated to achieve the desired operating performance. Motor speed is set based on such factors as the delivery of the tape 5, the transfer of the tape 5 to the intermediate reel 7, and the thickness of the tape 5 on the reel 7. Such rotational speed parameters are well known to those in the art.

The tape 5 used is preferably of special quality and, in particular, it must have sufficient mechanical properties to withstand the pulling forces and prolonged use. The tape 5 can be provided through its entire length with unremovable codes permitting instant location of the position of an image recorded on the tape 5. The length of the tape 5 is dependent on the use which will be made of the apparatus. In fact, since the tape 5 is hardly ever changed, the tape 5 can be considered as an integral part of the apparatus.

Certain applications of the present invention are described below. This description has deliberately omitted the problems (known and solved in all tape readers) arising from any variation occurring in the thickness of the layer of tape either on the feeding reel 2, receiving reel 4, or around the intermediate reel 7.

In the "delayed recording and playback" mode, the tape 5 issuing from the sub-assembly 1 is first wound around the intermediate reel 7 and then fixed to the receiving reel 4. Starting sub-assembly 1 and intermediate reel 7 while the receiving reel 4 is stopped causes the progressive storage of the tape around the intermediate reel 7. At any moment chosen by the user, the receiving reel 4 may be started and the tape drawn inside the intermediate reel and directed into the playback sub-assembly 3.

It will be noted that in order to unwind the tape 5 from inside the intermediate reel 7, the intermediate reel 7 turns at an angular speed slightly different from that of the plate 10. The reading of the tape 5 will in no way prevent the recording and storing (or progressive storing) of the tape 5 from continuing. It will be further appreciated that the tape playback speed is independent of the recording speed.

To rewind the tape, the motors actuating the reels (feeding, receiving and intermediate reels) should be able to turn in the reverse direction. For example, if the device is used with the tape 5 running from the feeding reel 7 to the receiving reel 4, the tape 5 can be rewound on the inner diameter of the intermediate reel 7. This is possible due to the fact that the rollers 8 can be displaced radially, in addition to their movement of rotation about their axis.

Because of its original design, the recording device described above presents many advantages and permits a very wide variety of working operations, "recording device" should be interpreted in a broad sense, and can be defined as designating any device which can be used for recording and playing back information on tape.

Another example of an application for this invention is in video recording. The sub-assembly 1 may be produced so as to allow the recording of signals received from a quick-motion video camera. The recorded images are viewed with a slight delay via the playback sub-assembly 3 at normal speed, reduced speed or even with a freeze frame effect. It is possible, in this application, to control and, if necessary, to improve a production process by altering certain basic parameters without having to wait for the end of recording.

In summary, the following operations can be carried out with the device according to the invention:

1) tape recording and storage;

2) tape recording and storing and, simultaneously delayed playback part of the stored tape;

3) playback of stored tape;

4) fast feeding of the tape on the outside of the intermediate reel 7 and at the same time playback of part of the stored tape;

5) fast feeding of the tape on the receiving reel 4 and recording;

6) fast rewind on the feeding reel 2 and playback of part of the stored tape; and 7) fast rewind on the inside of the intermediate reel 7 while at same time recording.

In accordance with the provisions of the patent statutes, the present invention has been described in what is considered to represent its preferred embodiment. However, it should be noted that the invention can be practiced otherwise than as specifically illustrated and described without departing from its spirit or scope.

I claim:

1. Tape recorder system for rendering independently operable in time, a tape recording device and a playback device, said tape recorder system comprising:

a fixed element which is a recording sub-assembly (1) comprising a feeding reel (2) and a recording device;

an element which is a playback sub-assembly (3) comprising a playback device and a receiving reel (4) of which the rotation is controlled by a motor; and a circular intermediate reel (7) imparted by a motor with rotational movement about its axis and positioned between the recording subassembly (1) and the playback sub-assembly (3), said intermediate reel comprising at its periphery a retractable bearing surface (8) for receiving a tape leaving the recording sub-assembly and a directing roller (6) from which the tape is directed towards the playback sub-assembly, said playback sub-assembly being connected to said intermediate reel and driven in rotation therewith.

2. Tape recorder system according to claim 1, characterized in that the bearing surface of the intermediate reel is constituted by a series of radially movable rollers.

3. Tape recorder system according to one of claim 1 or 2, characterized in that a rotating plate (10) is placed under the intermediate reel.

4. Tape recorder system according to one of the claims 1, 2 and 3, characterized in that a drive roller (11) with spring (12), is provided said drive roller being driven by a motor in such a way as to ensure a constant peripheral speed to the stored tape (5).

* * * * *